United States Patent [19]

Fabbri

[11] Patent Number: 4,776,200
[45] Date of Patent: Oct. 11, 1988

[54] GUIDE CHANNEL STRUCTURE FOR BARS OF VARIABLE DIAMETER

[75] Inventor: Vladimiro Fabbri, Faenza, Italy

[73] Assignee: I.E.M.C.A. S.p.A. Industria Elettromecannica Complessi Automatici, Faenza, Italy

[21] Appl. No.: 937,850

[22] Filed: Dec. 4, 1986

[30] Foreign Application Priority Data

Dec. 4, 1985 [IT] Italy ................................ 5122/85[U]

[51] Int. Cl.⁴ ............................................ B21B 39/14
[52] U.S. Cl. ...................................... 72/428; 226/199
[58] Field of Search ................ 72/428, 422; 226/196, 226/199; 82/38 R; 269/9

[56] References Cited

U.S. PATENT DOCUMENTS

| 1,142,235 | 6/1915 | Caldwell | 269/9 |
| 3,348,399 | 10/1967 | Prieur | 72/97 |
| 3,606,807 | 9/1971 | Rast | 82/38 R |

Primary Examiner—Lowell A. Larson
Attorney, Agent, or Firm—Guido Modiano; Albert Josif

[57] ABSTRACT

The guide channel structure comprises a plurality of sectors arranged side by side and having coaxially to support said bars respective pairs of jaw-like elements defining openable seats. The seats have different diameters substantially corresponding to the diameters of bars to be guided, and are individually selectively closeable or openable to permit the passage of smaller or larger diameter bars therethrough.

1 Claim, 2 Drawing Sheets

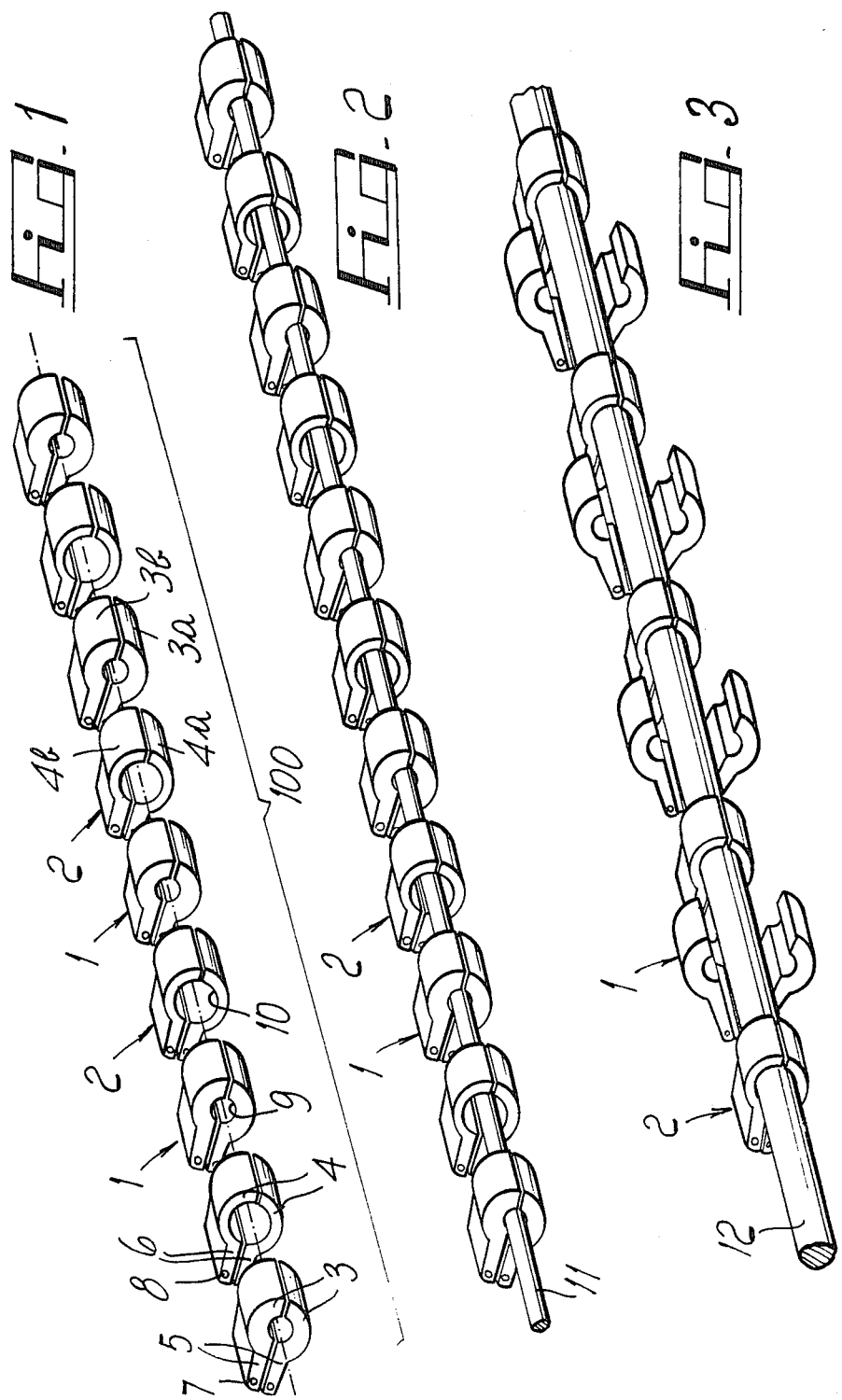

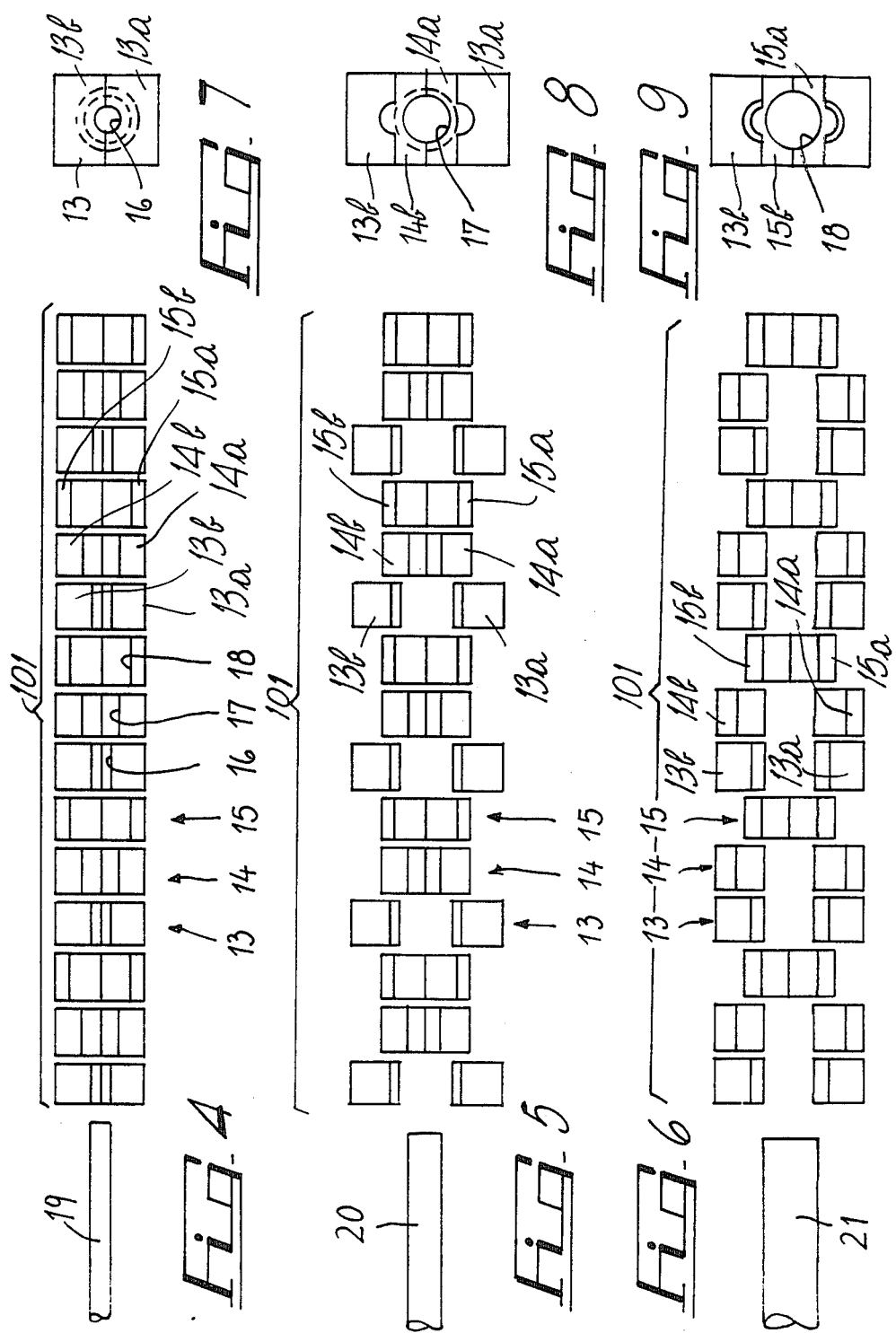

GUIDE CHANNEL STRUCTURE FOR BARS OF VARIABLE DIAMETER

BACKGROUND OF THE INVENTION

The present invention relates to a guide channel structure for bars of variable diameter.

As is known, in the field of mechanical machining there is the need to accurately guide bars, of circular cross-section, and often having a remarkable length, for example between bar feed means and a machine for working the bar, or between the various processing stations of a large scale plant or production line. As the diameter of the bars to be machined varies, e.g. as they are reduced in passing from one process to another, or according to the various diameters of different sizes of stock material to be machined, the problem arises of compulsorily changing also the dimensions of the channel in which the same bars are usually guided.

This may not only imply significant down-time of the machine or production line with inherent production losses, but also the requirement of skilled personnel, for substituting existing guide channels with guide channels having a different diameter every time, it is desired to use a stock material of different diameter and/or change machining operations, such that a different size workpiece is produced which must be subsequently guided to the next processing station.

Obviously, the substitute guide channels must be precisely aligned with the work stations and/or bar feed means. Misaligned guide channels can result in axial misalignment between the fed bar and the machine head at the processing station, which may cause, economically disadvantageous of incorrectly machined material, and potentially dangerous misaligned forces to act on and even damage the machine head itself or other parts of the work station, such as, for example, jigs or workpiece holding means associated therewith.

Accordingly, it is an aim of the present invention to solve the above described problem, by devising a guide channel structure which allows the guiding of bars with different diameters.

Within the scope of this aim, a further object of the invention is to provide a guide channel structure for bars which is of simple construction, easy to use, safe and completely reliable in operation, as well as relatively economical in cost.

Another object of the invention is to provided a guide channel structure which can be readily arranged for guiding bars of different sizes without implying significant downtime or the intervention of specialized personnel.

A further object of the invention is to provide a guide channel structure which can be readily arranged for guiding bars of different sizes without requiring any intervention for re-centering the guide channel structure itself.

A not least object of the invention is to provide a guide channel structure which can be manufactured, from commercially available elements and materials, and by employing standard plant and equipment commonly used in the field.

SUMMARY OF THE INVENTION

This aim and these objects, as well as others which will become apparent hereinafter, are achieved, according to the invention, by the present guide channel structure for bars with variable diameter, characterized in that it comprises a plurality of sectors arranged side by side and having coaxially, to support said bars, respective openable seats having alternately different diameters.

BRIEF DESCRIPTION OF THE DRAWINGS

Further characteristics and advantages of the invention will become apparent from the following detailed description of a preferred embodiment of the guide channel structure for bars of variable diameter, illustrated by way of example only in the accompanying illustrative, non limitative drawings, wherein:

FIG. 1 is a perspective view of a guide channel structure for bars having two different diameters;

FIG. 2 is a perspective view of the guide channel structure of FIG. 1, employed for guiding bars having the smaller of the two different diameters;

FIG. 3 is a perspective view of the guide channel structure of FIG. 1 employed for guiding bars having the larger of the two diameters;

FIG. 4 is a schematic side elevation view of a guide channel structure for bars having three different diameters, employed for guiding bars having the smallest of the three different diameters;

FIG. 5 is a schematic side elevation view of the guide channel structure of FIG. 4, employed for guiding bars having the intermediary of the three different diameters;

FIG. 6 is a schematic side elevation view of the guide channel structure of FIG. 4, employed for guiding bars having the largest of the three different diameters;

FIG. 7 is a schematic end elevation view of the guide channel structure of FIG. 4;

FIG. 8 is a schematic end elevation view of the guide channel structure of FIG. 5; and FIG. 9 is a schematic end elevation view of the guide channel structure of FIG. 6.

DESCRIPTION OF THE PREFERRED EMBODIMENTS

With reference to the above-cited drawing figures, the guide channel structure according to the invention, generally indicated by the reference numeral 100, is substantially composed of a plurality of openable sectors, alternately indicated with the reference numerals 1 and 2, the sectors 2 having a larger diameter than the sectors 1.

The sectors 1 and 2 each are similarly composed of an arrangement of jaw-like elements forming respective halves 3a,3b,4a,4b of sleeves 3 and 4 arranged coaxially. These jaws are openable by means of related arms 5 and 6, extending practically radially outwards from the sleeves 3 and 4 and articulated to pivots 7 and 8, lying substantially parallel to the axis of said sleeves 3,4.

With the sleeve halves 3a,3b, in a closed position (FIG. 1), the sleeves 3 each define an axial cavity 9 having a diameter, which is smaller than the cavity 10 defined by each of the sleeves 4 with the sleeve halves 4a,4b in a closed position, and complementary to the diametral dimensions of a bar 11 (FIG. 2) to be guided. Similarly, the cavities 10 of the sleeves 4 are complementary to the dimensions of a bar 12 (FIG. 3) having a greater diameter than the bar 11.

Accordingly, the sectors 1 define a guide channel for the bar 11 with a smaller diameter, as is clearly illustrated in FIG. 2. In this condition the sectors 2 for guiding the larger diameter bar 12 can either be opened or simply left in their closed position, since the smaller diameter bar 11 can pass therethrough without hindrance. Conversely, when it is required to guide the bar 12 having a greater diameter, the opening of the sectors 1 is effected and the same bar can be guided by the sectors 2.

The opening and closing of the sectors may be effected by employing any conventional power assisted means such as hydraulic, mechanical, electro-mechanical or pneumatic means, which for clarification purposes have not been illustrated in the drawing figures.

Naturally, the number of sectors provided will be related to the diameter and length of the bar to be supported and to the number of different diameters of bars to be guided, i.e. the smaller the number of different diameter bars and hence sectors, the more frequently a sector of a particular size can occur in the plurality of sectors. Thus, for example, if 10 different sizes of bars are to be guided and accordingly, 10 different sizes of sectors provided, then each particular sector will be interspaced from the next one of the same size by 9 differently sized sectors, and so forth.

Obviously, by placing the sectors closer or even almost adjacent to each other, considerable numbers of different size sectors may be employed while meeting bar support requirements, thus affording remarkable versatility in operation. Furthermore, the opening of the sectors allows the easy insertion of the bar in the guide.

In the subsequent FIGS. 4 to 9 a guide channel structure according to the invention is shown, which guide channel structure allows the guiding, according to the same principle, of bars having three different diameters. This guide channel structure, generally indicated by the reference numeral 101 is formed by a plurality of alternately arranged sectors 13,14 and 15 composed of respective halves or jaws 13a,13b,14a, 14b,15a,15b which define respective axial bores 16, 17 and 18 having a progressively increasing diameter, i.e. the smallest diameter bore being the bore 16, the bore 17 being of larger diameter than the bore 16, and the bore 18, in turn, having a larger diameter than the bore 17.

Therefore, to machine a bar 19 having a small diameter substantially corresponding to that of the bore 16 of the sectors 13 (FIGS. 4 and 7), one may operate with all of the sectors 13, 14 and 15 closed, the function of guiding the bar 19 being assigned only to the sectors 13, of the guide channel 101, since the larger diameter bores 17 and 18 of the sectors 14 and 15 do not interfere with the bar 19.

To machine a bar 20 having an intermediate diameter substantially corresponding to the diameter of the bore 17 of the sectors 14 (FIGS. 5 and 8), it is necessary to open the sectors 13 since the bore 16 has a smaller diameter than the bar 20, while the closed sectors 14 define the bore 17 to form the guide channel.

The sectors 15 do not have to be opened in this case since the bore 18, which has a larger diameter than the bar 20, will not interfere therewith as it is guided by the annular inner walls of the bores 17 of the sectors 14.

Finally, to process a bar 21 having a large diameter substantially corresponding to the diameter of the bore 18 of the sectors 15 (FIGS. 6 and 9) it is necessary to open both the pluralities of sectors 13 and 14, since the bores 17 and 18 have smaller diameters than the bar 21, while the closed halves 15a,15b of the plurality of sectors 15 form the guide channel.

Naturally, any number of sectors may be provided to form any required number of guide channels, different from the examples illustrated herein.

In practicing the invention, any materials, shapes and dimensions may be used according to requirements.

I claim:

1. Guide channel structure for bars having different diameters comprising a plurality of sectors composed of openable and coaxially aligned sleeves, a first portion of said sleeves defining an axial channel having a diameter corresponding to the diameter of a bar to be guided and at least a further portion of said sleeves defining an axial channel having a diameter different to that of said first portion and corresponding to the diameter of another bar to be guided, the sleeves of said first portion being alternatively arranged with respect to the sleeves of said further portion, each sleeve being composed of two halves, means for moving the sleeves of each portion between an open and a closed position.

* * * * *